(12) United States Patent
Chen

(10) Patent No.: US 12,266,826 B2
(45) Date of Patent: Apr. 1, 2025

(54) BUTTON BATTERY AND ELECTRONIC DEVICE

(71) Applicant: Guangdong Mic-power New Energy Co., Ltd., Guangdong Huizhou (CN)

(72) Inventor: Zhiyong Chen, Huizhou (CN)

(73) Assignee: GUANGDONG MIC-POWER NEW ENERGY CO., LTD., Huizhou (CN)

( * ) Notice: Subject to any disclaimer, the term of this patent is extended or adjusted under 35 U.S.C. 154(b) by 407 days.

(21) Appl. No.: 17/597,937

(22) PCT Filed: Dec. 20, 2019

(86) PCT No.: PCT/CN2019/127142
§ 371 (c)(1),
(2) Date: Jan. 28, 2022

(87) PCT Pub. No.: WO2021/088221
PCT Pub. Date: May 14, 2021

(65) Prior Publication Data
US 2022/0294086 A1    Sep. 15, 2022

(30) Foreign Application Priority Data

Nov. 5, 2019 (CN) .......................... 201911072196.4
Nov. 5, 2019 (CN) .......................... 201921899156.2

(51) Int. Cl.
*H01M 50/533* (2021.01)
*H01M 50/109* (2021.01)
*H01M 50/184* (2021.01)
*H01M 50/186* (2021.01)
*H01M 50/536* (2021.01)

(52) U.S. Cl.
CPC ....... *H01M 50/533* (2021.01); *H01M 50/109* (2021.01); *H01M 50/184* (2021.01); *H01M 50/186* (2021.01); *H01M 50/536* (2021.01)

(58) Field of Classification Search
None
See application file for complete search history.

(56) References Cited

FOREIGN PATENT DOCUMENTS

| CN | 107195807 A | 9/2017 |
|---|---|---|
| CN | 109037510 A | 12/2018 |
| CN | 109786611 A | 5/2019 |
| CN | 110336065 A | 10/2019 |
| JP | 2011129330 A | 6/2011 |
| JP | 2014049371 A | 3/2014 |

*Primary Examiner* — Tracy M Dove
(74) *Attorney, Agent, or Firm* — VLP Law Group, LLP

(57) ABSTRACT

Disclosed are a button battery and an electronic device. The battery includes: a battery cell; at least one tab with one end thereof connected to one collector of the battery cell; and a shell including a first housing and a second housing hermetically connected onto each other to enclose and form a cavity in which the battery cell and the tab are positioned, wherein the at least one tab is connected with the other end thereof to an inner wall of the first housing or to an inner wall of the second housing before the first housing and the second housing are hermetically connected.

12 Claims, 5 Drawing Sheets

BUTTON BATTERY AND ELECTRONIC DEVICE

CROSS-REFERENCE TO RELATED APPLICATIONS

This application claims priority to Chinese Patent Application No. 201911072196.4 and Chinese Patent Application No. 201921899156.2, both filed with the Chinese Patent Office on Nov. 5, 2019 and entitled "BUTTON BATTERY AND ELECTRONIC DEVICE", the contents of each of which are incorporated herein by reference in their entirety.

TECHNICAL FIELD

The present disclosure relates to the technical field of energy storage apparatuses, and more specifically to a button battery and an electronic device.

BACKGROUND

Button batteries, especially rechargeable button batteries, due to their small size, are widely used in electronic products, e.g. wireless headphones, electronic watches and the like. During assembly of button batteries, a shell thereof needs to be welded to electrodes of a battery cell through tabs.

A shell typically includes two housings that are fitted with each other. The two housings are provided therebetween with an insulating ring. The insulating ring is formed by plastic films connected end to end, and is formed in a uniform thickness which results in a poor sealing performance of the shell.

Therefore, a new technical solution is needed to solve at least one of the above technical problems.

SUMMARY

An object of the present disclosure is to provide a new technical solution for a button battery.

According to a first aspect of the present disclosure, a button battery is provided. The battery includes: a battery cell; at least one tab with one end thereof connected to one collector of the battery cell; a shell including a first housing and a second housing, wherein the first housing and the second housing each have a recess and are hermetically connected onto each other to enclose and form a cavity in which the battery cell and the tab are positioned; the tab is connected with the other end thereof to the first housing or the second housing; the first housing and the second housing are provided therebetween with an annular seal whose thicknesses at an open end of the first housing and at an open end of the second housing are greater than that of an axially centered portion of the annular seal.

Optionally, at least one of the first housing and the second housing includes a top portion and a sidewall portion, the sidewall portion is arranged around a periphery of the top portion and connected to the periphery of the top portion to form the recess; the top portion is welded to the other end of the tab and is formed in an inward concave curved surface structure or an outward convex curved surface structure.

Optionally, both the first housing and the second housing include a top portion and a sidewall portion that are interconnected and together form the recess; the first housing and the second housing are fitted with their open ends facing each other; the two sidewall portions are provided therebetween with an annular seal, and the annular seal is in a V-shaped structure with one edge thereof and is sleeved outside one of the sidewall portions which extends into the V-shaped structure with an edge thereof.

Optionally, the mouth edge of the outer sidewall portion converges inwardly as a whole to squeeze the annular seal.

Optionally, the mouth edge of the outer sidewall portion partly protrudes inward to form a closing portion.

Optionally, there is a plurality of closing portions which are evenly distributed on the edge of the sidewall portion.

Optionally, the inner sidewall portion forms an annular convergence portion at a position corresponding to the mouth edge, and the mouth edge is curved towards the annular convergence portion.

Optionally, the inner sidewall portion has an outwardly protruding annular protrusion with an edge at the open end.

Optionally, seal parts are respectively formed at the open end of the first housing and at the open end of the second housing; the two sidewall portions are spaced apart from each other between the two seal parts; the annular seal forms a V-shaped structure with one end thereof having a larger thickness.

Optionally, the annular seal is injection molded.

Optionally, the other end of the tab is welded to the inner wall of the above first housing or to the inner wall of the second housing through the welding spot through the tab.

Optionally, the tab includes welding areas at both ends thereof and is covered with insulating material except for the welding areas.

According to another embodiment of the present disclosure, an electronic device is provided. The electronic device includes the above button battery.

According to an embodiment of the present disclosure, the button battery has a good sealing performance.

Through the following detailed description of exemplary embodiments of the present disclosure with reference to the drawings, the other features and advantages of the present disclosure will become clear.

BRIEF DESCRIPTION OF THE DRAWINGS

The drawings incorporated in and constituting a part of the specification show embodiments of the present disclosure and together with the description thereof, are used to explain the principle of the present disclosure.

11: first housing; 12: second housing; 13: battery cell; 141: first tab; 142: second tab; 15: annular seal; 151: V-shaped structure; 152: parts at both ends; 101: annular curving portion; 102: closing portion; 103: second top; 104: annular protrusion; 105: first sidewall portion; 106: second sidewall portion; 107: annular convergence portion; 108: sealant; 109: first top; 16: welding bead or welding spot; 17: welding needle.

DETAILED DESCRIPTION

Various exemplary embodiments of the present disclosure will now be described in detail with reference to the attached drawings. It should be noted that unless otherwise specified, the relative arrangement, numerical expressions and numerical values of the components and steps described in these embodiments do not limit the scope of the present disclosure.

The following description of at least one exemplary embodiment is in fact merely illustrative and never intended for any restriction on the present disclosure and its application or use.

The technology, methods and equipment known to those skilled in the art may not be discussed in detail, but where appropriate, the said technology, methods and equipment shall be considered as part of the specification.

Of all the examples shown and discussed here, any specific value should be interpreted as merely illustrative, not as a restriction. Therefore, other examples of exemplary embodiments may have different value.

It should be noted that similar reference signs and letters indicate similar items in the attached figures below. Accordingly, once an item is defined in an accompanying drawing, it does not require further discussion in subsequent drawings.

Figure 1:
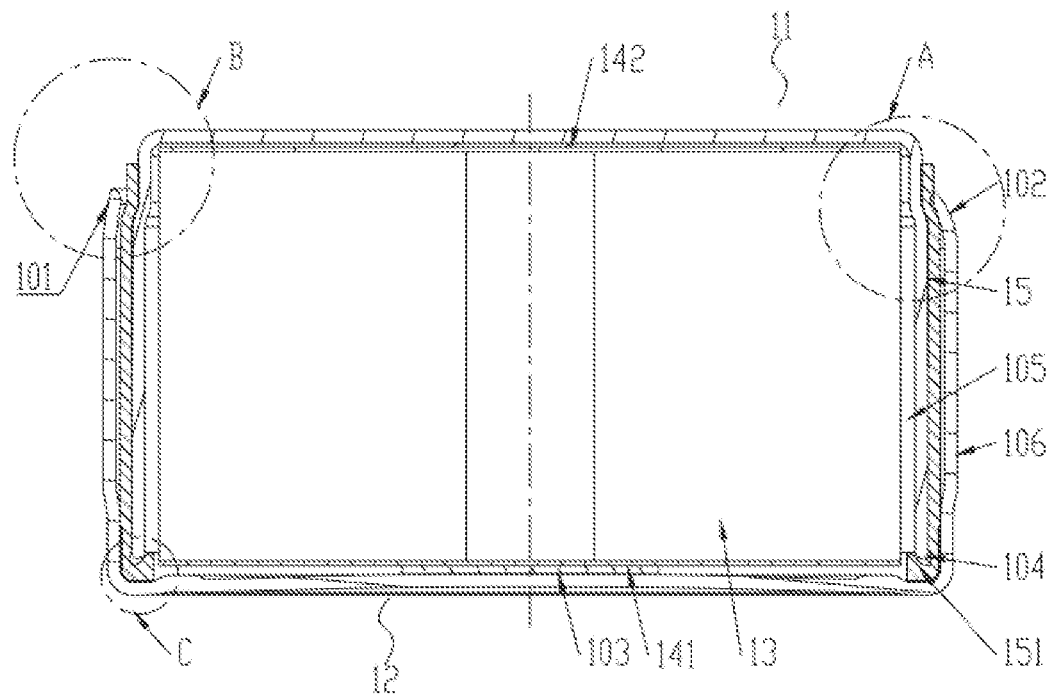
FIG. 1 is a cross-sectional view of a button battery according to an embodiment of the present disclosure.
Figure 7:
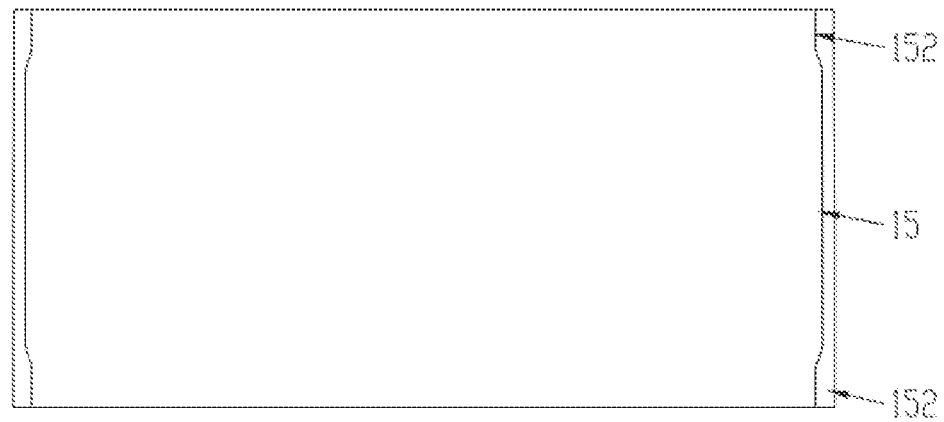
FIG. 7 is a cross-sectional view of an annular seal according to an embodiment of the present disclosure.
Figure 8:
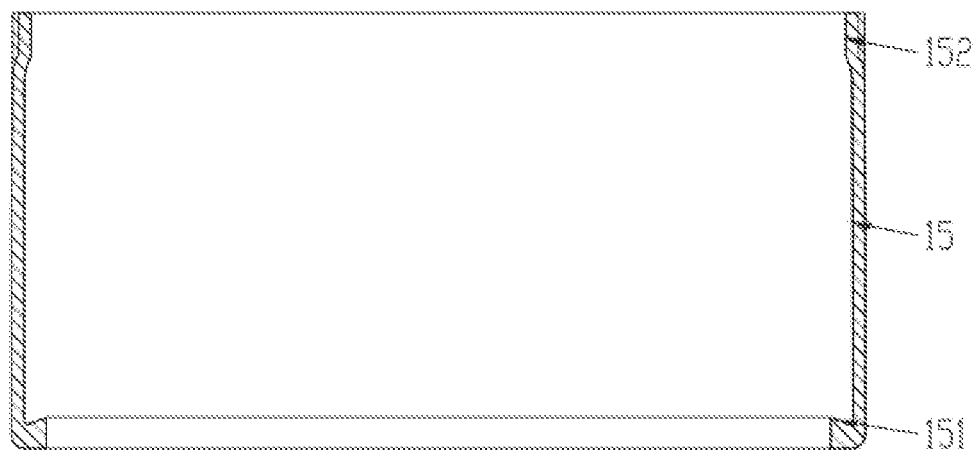
FIG. 8 is a cross-sectional view of another annular seal according to an embodiment of the present disclosure.
Figure 9:
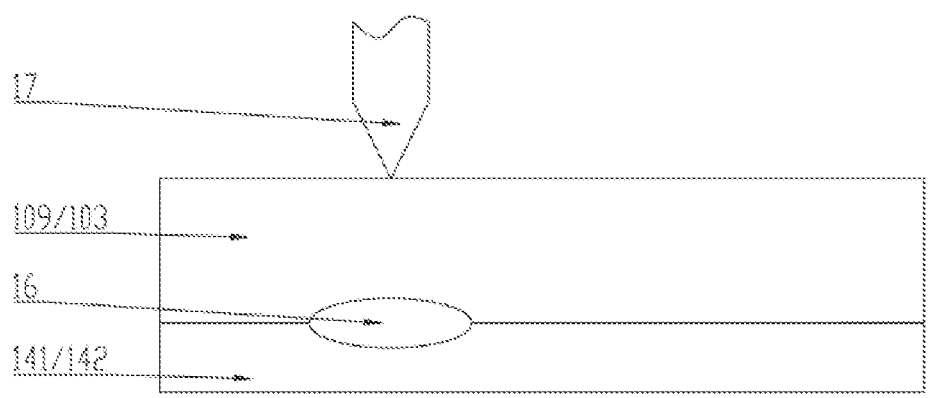
FIG. 9 is a schematic diagram of a welding method according to an embodiment of the present disclosure.

According to one embodiment of this disclosure, a button battery is provided. As shown in FIGS. 1, 7 and 8, the button battery comprises a shell, a battery cell 13 and at least one tab.

The battery cell 13 is used for conversion of electrical energy to chemical energy and/or chemical energy to electrical energy. For example, the positive material for the battery cell 13 includes lithium-containing compounds such as lithium cobalt, lithium iron phosphate or ternary system materials etc. The negative material for the battery cell 13 includes graphite. The above two materials are respectively attached to different collectors. The collectors are metal foils. The positive material and the negative material are provided with an ion exchange film therebetween. Lithium ions can pass through the ion exchange film, while other materials such as graphite cannot pass through. For example, the battery cell 13 adopts a winding or laminated structure.

The shell comprises a first housing 11 and a second housing 12. The first housing and the second housing have a recess, that is, a recessed cavity is formed. The first housing 11 and the second housing 12 are hermetically connected onto each other to enclose and form the cavity. The first housing 11 and the second housing 12 are provided with an annular seal 15 therebetween to insulate the first housing 11 from the second housing 12. The annular seal 15 is an insulating material whose material is plastic, rubber, etc.

Thicknesses of the annular seal 15 at the open end of the first housing 11 and the open end of the second housing 12 are greater than that of the central portion of the annular seal 15 in the axial direction.

As shown in FIGS. 1 and 7, seal parts are respectively formed at the open end of the first housing 11 and at the open end of the second housing 12; the two sidewall portions are spaced apart between the two seal parts; the thicknesses of the annular seal 15 at the two open ends are greater than that of the central portion of the annular seal 15 in the axial direction. For example, the first housing 11 and the second housing 12 are pressed against each other at the above two open ends by rolling processing to form two strip-shaped annular seals.

In this example, the shell forms two strip-shaped annular seals. Compared with the integral surface seal between the first sidewall portion 105 and the second sidewall portion 106 where they overlap, the strip-shaped annular seal forms a greater extrusion force, which improves the sealing performance of the two housings.

In addition, between the two strip-shaped annular seals, the first sidewall portion 105 and the second sidewall portion 106 are spaced apart from each other, with space between them. The space forms a buffer space. In this way, even if the first sidewall portion 105 and the second sidewall portion 106 deform locally in the spaced area, it will have no impact on the sealing of the housings.

In addition, the thicknesses of the annular seal 15 at the two seals are greater than that of the central portion of the annular seal 15 in the axial direction, referring to the parts 152 at both ends in FIG. 7. With this arrangement, the thicker part can undergo a greater elastic deformation when pressed by the two housings, which makes the sealing performance of the shell.

In one example, the annular seal 15 protrudes at the edge of the gap formed by the first housing 11 and the second housing 12 and thus is filled in the gap. In this way, dust, rain, sweat and so on from the outside will not accumulate in the gap, which can avoid corrosion of the first housing 11 and the second housing 12 due to accumulation of foreign matters.

The battery cell 13 and the tab are positioned in the cavity. There is provided at least one tab, with one end thereof connected to one collector of the battery cell 13, and with the other end thereof connected to the shell. In the battery cell 13 with the winding structure, the tab includes a first tab 141 and a second tab 142. For example, the first tab 141 is used to connect the positive collector with one of the housings, such as the second housing 12; the second tab 142 is used to connect the negative collector with the other housing, such as the first housing 11.

Alternatively, the first tab 141 is used to connect the negative collector with the first housing 11; the second tab 142 is used to connect the positive collector with the second housing 12.

For example, when being assembled, firstly, one end of the at least one tab is connected to the positive collector or the negative collector. Then the battery cell 13 and the tab are placed together into the cavity.

In an embodiment of the present disclosure, the other end of the at least one tab is welded to an inner wall of the first housing 11 or an inner wall of the second housing 12. For example, before or after the first housing 11 and the second housing 12 are assembled together to form the shell, firstly, one end of the at least one tab and the inner wall of the first housing 11 or the inner wall of the second housing 12 are welded together. For example, laser welding or resistance welding is used.

The weld bead or welding spot 16 spreads outward from the position where the tab contacts the inner wall of the first housing 11 or spreads outward from the position where the tab contacts the inner wall of the second housing 12.

For example, as shown in FIG. 8, during the welding process, the welding needle 17 is positioned outside the shell. The welding needle abuts against the shell, for example, against an outer side of the first top portion 109 or the second top portion 103. Since the welding needle and the shell are in contact with each other and abut against each other, the resistance between the two is very small and an electrical connection can be formed. Therefore, no welding bead or welding spot is formed at the position where the welding needle 17 contacts the shell. There is a very large resistance at the position where the tab contacts the shell (for example, the first tab 141 contacts the first top portion 109, or the second tab 142 contacts the second top portion 103). The current generates a large amount of heat at this position, which melts the metal on both sides of the interface and thus forms the welding bead or the welding spot 16. As heat accumulates, the welding bead or the welding spot 16 gradually spreads outward from the interface, thus forming a larger molten area. In this way, the tab and the shell are welded together after cooling. Welding strength is improved in comparison with a welding method in which the welding spot penetrates through the tab or the shell.

In addition, this welding method avoids dents from forming on the surface of the shell or the tab opposite to the welding bead or welding spot 16, thus keeping structural integrity and good appearance of the welded button battery.

In addition, by controlling the magnitude of the welding current, it is possible that the welding bead or welding spot cannot extend to the outer surface of the shell (e.g. the first housing 11, the second housing 12) or the tab, that is, the shell or the tab cannot be welded through. In this way, welding has little effect on the structural strength of the housing or tab.

Of course, during welding, the welding needle can alternatively be positioned on the inner side of the shell, that is, on the side of the tab.

In one example, welding is performed before the first housing and the second housing are hermetically connected. Since the shell has not been closed, the welding process can be observed and it is easy to check the welding effect. In this way, it is easy to locate the position of the welding torch and the welding position on the shell, and thus improving the welding accuracy between the tab and the shell.

In addition, this method can effectively reduce poor welding and avoid the tab is not welded to the shell.

In another example, welding is performed after the first housing and the second housing are hermetically connected. This method can reduce the production difficulty of button battery and improve the degree of automatic production.

In one example, before welding the other end of the tab is pre-fixed to the inner wall of the first housing 11 or to the inner wall of the second housing 12. The pre-fixed way can be but not limited to bonding, locking connecting, etc. For example, one end of the tab is bonded to the inner wall of any housing by a binder, double-sided tape, etc. During the welding process, due to high temperature, binder, double-sided tape can be melted off without leaving residue. By pre-fixing the tab to the inner wall of the shell, the welding position can be more accurate.

Figure 5:
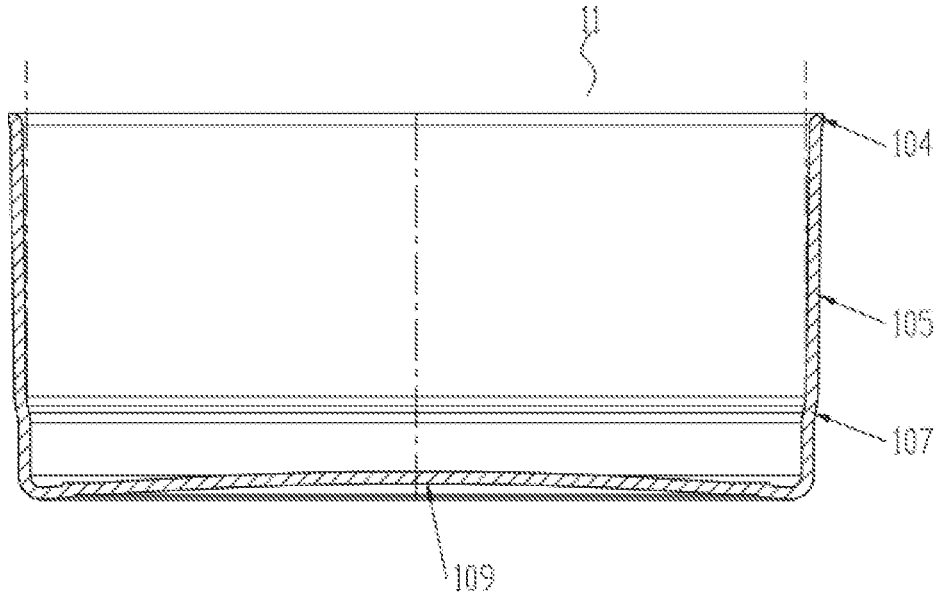
FIG. 5 is a cross-sectional view of another first housing according to an embodiment of the present disclosure.
Figure 6:
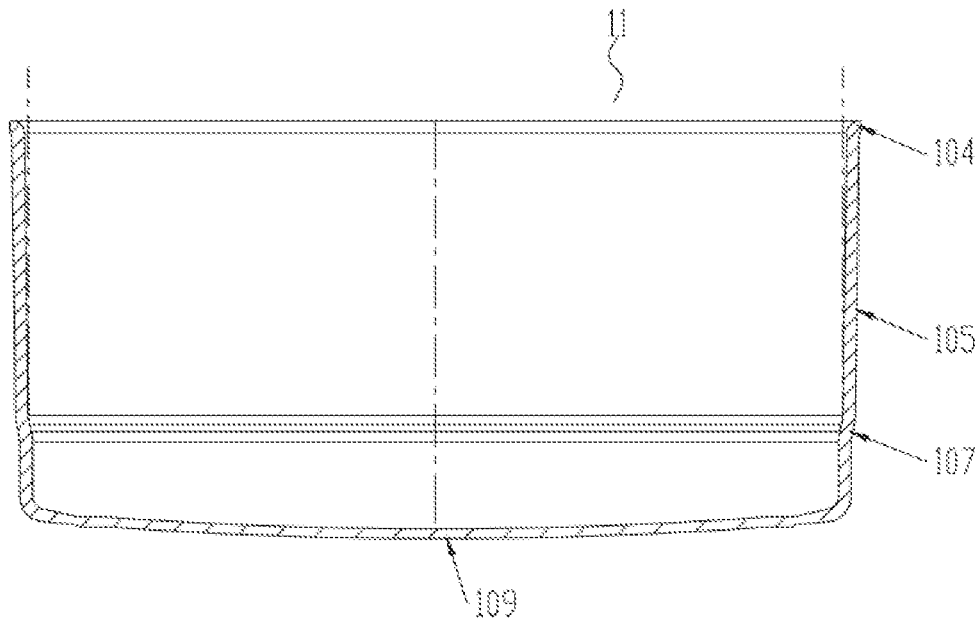
FIG. 6 is a cross-sectional view of one more first housing according to an embodiment of the present disclosure.

In one example, as shown in FIGS. 1, 5 and 6, at least one of the first housing 11 and the second housing 12 includes a top portion and a sidewall portion. The sidewall portion is arranged around the periphery of the top portion and is connected to the periphery of the top portion. The other end of the tab is welded and connected to the top portion. For example, one end of the tab is welded to the top portion of the first housing 11 or the second housing 12 by the welding method mentioned above. The top portion is formed in an inward concave curved surface structure or an outward convex curved surface structure. The above two curved surface structures make the top portion have a larger area, which makes the welding of the tab easier.

In addition, the inward concave curved surface structure has the function of buffering. After the assembly is completed, the button battery will undergo the processes of liquid injection, formation, and volume division and the like. In this process, gas will be generated in the cavity, resulting in an increase of the internal pressure. If the top portion is flat, it will cause bulging at the top portion due to the increase of internal pressure. The inward concave curved surface makes the top portion gradually flatten during the increase of internal pressure, thereby buffering the deformation of the shell caused by the increase of internal pressure and keeping the shape of the shell regular.

In addition, the outward convex curved surface can reduce the stress concentration of the top edge and improve the structural strength of the top portion. During the increase of internal pressure, the outward convex curved surface can have a higher structural strength relative to the flat top, and it is not easy to deform.

In other examples, the tab can also be connected to the sidewall portion.

Figure 4:
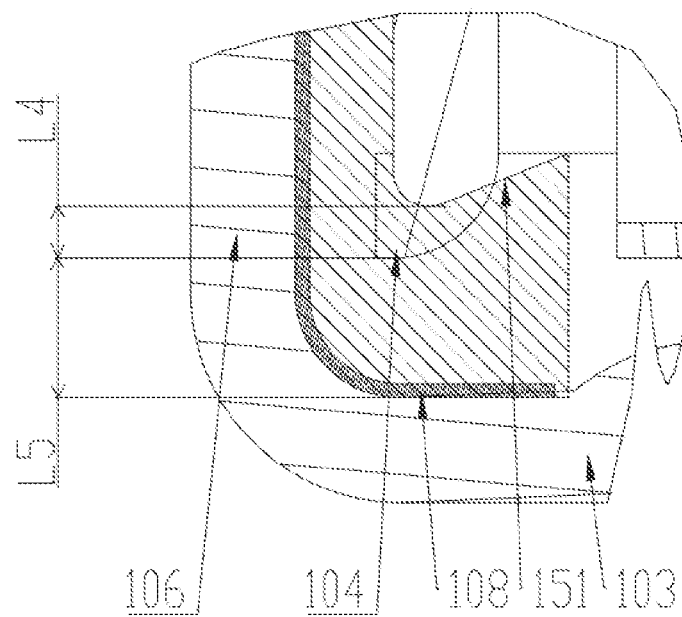
FIG. 4 is a partially enlarged view at position C in FIG. 1.

In one example, as shown in FIGS. 1, 4 and 8, both the first housing 11 and the second housing 12 include a top portion and a sidewall portion that are interconnected. For example, the first housing 11 includes a first top portion 109 and a first sidewall portion 105; the second housing 12 includes a second top portion 103 and a second sidewall portion 106. Both housings are in a cylindrical structure which is closed at one end and is open at the other end. For example, the first housing 11 includes a first sidewall portion 105 and a second sidewall portion 106, and the first housing 11 and the second housing 12 are fitted with their open ends facing each other. An annular seal 15 is provided between the two sidewall portions. One edge of the annular seal 15 has a V-shaped structure 151, as shown in FIG. 7. The annular seal 15 is sleeved outside one of the sidewall portions (e.g. the first sidewall portion 105), and the edge of this sidewall portion extends into the V-shaped structure 151 and presses against it.

For example, as shown in FIG. 4, the edge of the first sidewall portion 105 presses the V-shaped structure 151. The size of the first sidewall portion 105 extending into the V-shaped structure 151 in the axial direction is L4, and the remaining size of the V-shaped structure in the axial direction is L5, wherein, L4<L5≤0.5 mm. Within this size range, the sealing performance there is good, and the V-shaped structure 151 can maintain sufficient structural strength without being damaged.

In this example, the V-shaped structure 151 is able to effectively wrap the open end of the first sidewall portion 105, thus forming a L-shaped sealing edge. In this way, the sealing performance between two housings is better.

For example, the annular sealing 15 forms a V-shaped structure 151 at one of the two ends thereof having a larger thickness than the other end. The portion of the V-shaped structure 151 near the open end of the second housing has a greater thickness, which makes the sealing performance formed between the V-shaped structure 151 and the two housings better.

For example, a sealant 108 is applied on the outer side of the L-shaped sealing edge. The sealant 108 is able to fill the gap between the second housing 12 and the annular seal 15 at the corner, thus making the sealing performance of the two housings good.

In one example, the annular seal 15 is injection molded. In this way, the V-shaped structure 151 is formed by injection molding, rather than reserving a part in the process of assembling the shell, and then curving it inward. Injection molding can ensure accuracy of the size and consistency of the processing of the V-shaped structure 151.

Figure 2:
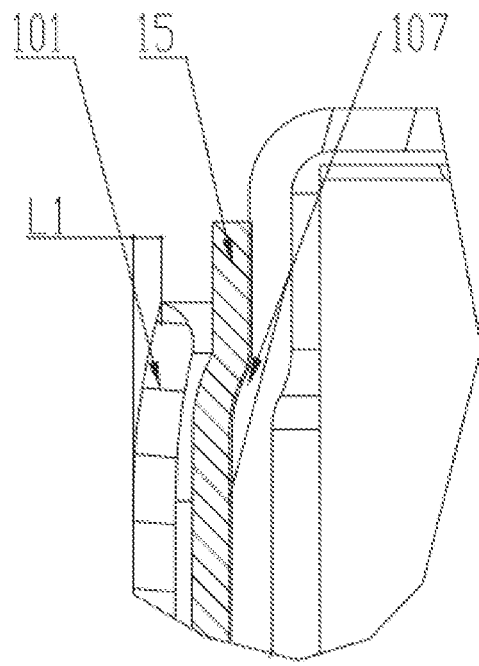
FIG. 2 is a partially enlarged view at position A in FIG. 1.

In one example, as shown in FIGS. 1 and 2, the open end of the outer sidewall portion converges inward as a whole to squeeze the annular seal 15. For example, the open end of the second sidewall portion 106 converges inward to form an annular curving portion 101. The annular curving portion 101 can form a circumferential pressure on the annular seal 15, thus forming a strip-shaped annular seal. In this way, the sealing performance of the first housing 11 and the second housing 12 is good.

For example, the curving size L1 of the annular curving portion 101 is less than or equal to 0.5 mm. The shell in this size range has a good sealing performance.

Figure 3:
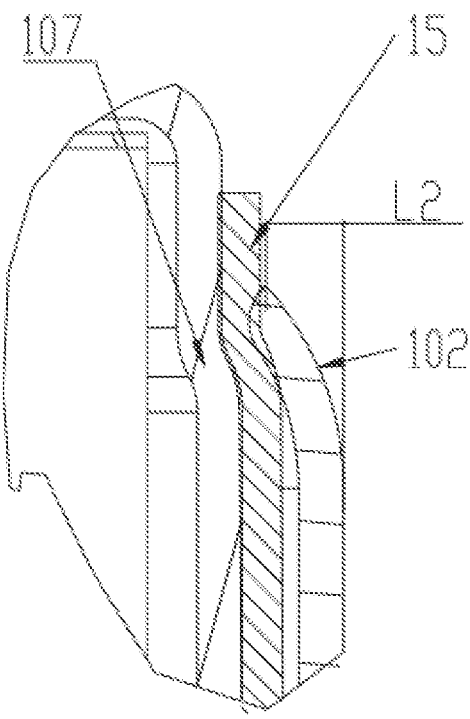
FIG. 3 is a partially enlarged view at position B in FIG. 1.

In one example, as shown in FIGS. 1 and 3, the open end of the outer sidewall portion (e.g. the second sidewall portion 106) partly protrudes inward to form a closing portion 102. For example, a part of the annular curving portion 101 protrudes inward to form a closing portion 102. For example, there is a plurality of closing portions 102, and the plurality of closing portions 102 are evenly distributed at the open end of the sidewall portion (e.g. the second sidewall portion 106). The closing portion 102 improves binding force between the first housing 11 and the second housing 12 as well as the integrity of the shell.

For example, the curving size L2 of the closing portion 102 is less than or equal to 1 mm, wherein L1 is less than L2. In this size range, connection performance between the first housing 11 and the second housing 12 is good.

In other examples, it can also be provided with only one closing portion 102.

In one example, as shown in FIGS. 1 and 2, the inner sidewall portion (e.g. the first sidewall portion 105) forms an annular convergence portion 107 at a position corresponding to the open end of the outer sidewall portion (e.g. the second sidewall portion 106). The open end is curved toward the annular convergence portion 107. The annular convergence portion 107 is an annular inclined surface that converges inward. In this example, the annular seal 15 is pressed between the annular curving portion 101 and the annular inclined surface. The annular inclined surface has a larger contact area with the annular curving portion 101 than the vertical surface, which makes the sealing performance there better.

In addition, the annular convergence portion 107 makes the two housings fit stronger.

In one example, the inner diameter of the inner sidewall portion (e.g. the first sidewall portion 105) of the two sidewall portions is configured to gradually increase from the top portion to the open end. For example, the inner diameter of the sidewall portion increases linearly, or increases stepwise. Since the open end has the largest the inner diameter, the battery cell 13 can be easily installed in the cavity.

In one example, as shown in FIGS. 4 and 5, the edge of the inner sidewall portion (e.g. the first sidewall portion 105) at the open end has an annular protrusion 104 protruding outward. When being sealed, the outer sidewall portion (e.g. the second sidewall portion 106) will produce extrusion at the position corresponding to the annular protrusion 104. As annular protrusion 104 is closer to the outer sidewall portion (e.g. the second sidewall portion 106), it is easier to form a seal with the shell, and the sealing performance is better.

For example, as shown in FIG. 4, the annular protrusion 104 presses the annular seal in the radial direction. In this way, the annular seal 15 forms a pressure concentration area at its pressed position, so that the sealing performance between the annular seal 15 and the outer housing (e.g. the second housing 12) is better.

In one example, the tab includes welding areas at both ends thereof. One of the welding areas is welded and connected to one collector of the battery cell 13 and the other of the welding areas is welded and connected to the shell. The two welding areas are respectively located on two opposite surfaces. The tab is covered with insulating material except for the welding areas. For example, the insulating material is an insulating film or an insulating coating. The insulating material is plastic, fiberglass, rubber, silicone, etc. The insulating material can effectively avoid contacting the tab with the end of the battery cell 13 and prevent the battery cell 13 from short circuit.

In addition, since the shell does not need to reserve a space for the tab and the end of the battery cell 13, the battery cell 13 can be made larger. In this way, capacity of the battery can be significantly increased.

According to another embodiment of this disclosure, an electronic device is provided. The electronic device may be, but is not limited to, headphones, mobile phones, laptops, hearing aids, VR devices, AR devices, electronic watches, game consoles, etc. The electronic device incorporates the button battery mentioned above.

The electronic device is characterized by good safety performance.

Although some specific embodiments of the present disclosure have been described in detail through examples, however, those skilled in the art should understand that the above examples are only for illustration, not for limiting the scope of the present disclosure. Those skilled in the art should understand that the above embodiments can be modified without departing from the scope and spirit of the present disclosure. The scope of the present disclosure is defined by the appended claims.

The invention claimed is:

1. A button battery, comprising:
a battery cell;
at least one tab with one end thereof connected to one collector of the battery cell; and
a shell comprising a first housing and a second housing, wherein the first housing and the second housing each have a recess and are hermetically connected onto each other to enclose and form a cavity in which the battery cell and the tab are positioned;
the tab is connected with its other end to the first housing or the second housing;
the first housing and the second housing are provided therebetween with an annular seal whose thicknesses at an open end of the first housing and at an open end of the second housing are greater than that of an axially centered portion of the annular seal.

2. The button battery of claim 1, wherein: at least one of the first housing and the second housing comprises a top portion and a sidewall portion; the sidewall portion is arranged around a periphery of the top portion and connected to the periphery of the top portion to form the recess; the top portion is welded to the other end of the tab and is formed in an inward concave curved surface structure or an outward convex curved surface structure.

3. The button battery of claim 1, wherein: both the first housing and the second housing comprise a top portion and a sidewall portion that are interconnected and together form the recess; the first housing and the second housing are fitted with their open ends facing each other; the two sidewall portions are provided therebetween with the annular seal, and the annular seal is in a V-shaped structure with one edge of the annular seal and is sleeved outside one of the sidewall portions, an edge of which extends into the V-shaped structure.

4. The button battery of claim 3, wherein: a mouth edge of an outer sidewall portion of the two sidewall portions converges inwardly as a whole to squeeze the annular seal.

5. The button battery of claim 4, wherein: the mouth edge of the outer sidewall portion partly protrudes inward to form a closing portion.

6. The button battery of claim 5, wherein: there is a plurality of closing portions which are evenly distributed on the mouth edge of the outer sidewall portion.

7. The button battery of claim 3, wherein: an inner sidewall portion of the two sidewall portions forms an annular convergence portion at a position corresponding to a mouth edge, and the mouth edge is curved towards the annular convergence portion.

8. The button battery of claim 7, wherein: the inner sidewall portion has an outwardly protruding annular protrusion with an edge at the open end.

9. The button battery of claim 3, wherein: seal parts are respectively formed at the open end of the first housing and at the open end of the second housing; the two sidewall portions are spaced apart from each other between two seal parts of the first housing and the second housing; the annular seal forms a V-shaped structure at one end of the annular seal having a larger thickness than the other end of the annular seal.

10. The button battery of claim 1, wherein: the annular seal is injection molded.

11. The button battery of claim 1, wherein: the tab comprises welding areas at both ends thereof and is covered with insulating material except for the welding areas.

12. An electronic device, comprising the button battery of claim 1.

* * * * *